(12) United States Patent
Hui et al.

(10) Patent No.: US 9,667,536 B2
(45) Date of Patent: May 30, 2017

(54) NETWORK TRAFFIC SHAPING FOR LOW POWER AND LOSSY NETWORKS

(71) Applicant: Cisco Technology, Inc., San Jose, CA (US)

(72) Inventors: Jonathan W. Hui, Belmont, CA (US); Wei Hong, Berkeley, CA (US); Jeongyeup Paek, Santa Clara, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 931 days.

(21) Appl. No.: 13/653,084

(22) Filed: Oct. 16, 2012

(65) Prior Publication Data

US 2014/0105015 A1  Apr. 17, 2014

(51) Int. Cl.
    *H04L 12/24*  (2006.01)
    *H04L 12/753* (2013.01)

(52) U.S. Cl.
    CPC .................. *H04L 45/48* (2013.01)

(58) Field of Classification Search
    CPC .................................... H04L 45/48
    USPC ............................... 370/230, 238
    See application file for complete search history.

(56) References Cited

U.S. PATENT DOCUMENTS

| 6,788,689 | B1 | 9/2004 | Turner et al. | |
|---|---|---|---|---|
| 7,269,139 | B1 | 9/2007 | Williams, Jr. et al. | |
| 7,281,265 | B1 | 10/2007 | Gage et al. | |
| 7,656,800 | B2 | 2/2010 | Morandin | |
| 7,672,244 | B2 | 3/2010 | Sweeney | |
| 7,969,974 | B2 | 6/2011 | Arango et al. | |
| 8,116,200 | B2 | 2/2012 | Tychon et al. | |
| 2003/0079005 | A1* | 4/2003 | Myers et al. | 709/223 |
| 2005/0286426 | A1* | 12/2005 | Padhye et al. | 370/238 |
| 2006/0050653 | A1* | 3/2006 | Guichard | H04L 45/54 370/254 |
| 2007/0236345 | A1* | 10/2007 | Yu et al. | 340/539.22 |
| 2008/0117822 | A1* | 5/2008 | Murphy | H04W 40/14 370/235 |
| 2008/0144497 | A1* | 6/2008 | Ramprashad et al. | 370/230.1 |
| 2008/0243386 | A1 | 10/2008 | Kumar et al. | |
| 2011/0170448 | A1* | 7/2011 | Buob et al. | 370/252 |
| 2011/0188653 | A1* | 8/2011 | Yao et al. | 380/255 |

(Continued)

OTHER PUBLICATIONS

Networking Working Group By JP VAssuer ,Sep. 2011.*

(Continued)

*Primary Examiner* — Man Phan
*Assistant Examiner* — Pamit Kaur
(74) *Attorney, Agent, or Firm* — Parker Ibrahim & Berg LLC; James M. Behmke; Stephen D. LeBarron

(57) ABSTRACT

In one embodiment, data packet messages are received in a Field Area Router (FAR) sent from one or more sources toward one or more destination devices in a Low-Power Lossy Network (LLN). An LLN routing topology for the data packet messages is interpolated in the FAR. An expected time for the data packet messages to reach a destination device in the LLN is determined based upon the routing topology interpolation. Traffic shaping is applied by the FAR for the data packet messages based upon the determined expected time for the data packet messages to reach destination devices in the LLN.

19 Claims, 6 Drawing Sheets

(56) References Cited

U.S. PATENT DOCUMENTS

2011/0231573 A1* 9/2011 Vasseur ............... H04L 45/48
709/238

OTHER PUBLICATIONS

Kirby, B.J.; Van Dyke, J.W.; *Congestion Management Requirements, Methods and Performance Indices*, Oak Ridge National Laboratory, Jun. 2002.
Shmuel S.; *Transmission Pricing and Congestion Management: Efficiency, Simplicity and Open Access*, University of California at Berkeley; Berkeley, California.
Bompard, Ettore, Member IEEE; Correia, Pedro, Fellow IEEE; Gross, George, Fellow IEEE; Amelin, Mikael, *Congestion-Management Schemes: A Comparative Analysis Under a Unified Framework*, 0885-8950/1$17.00 © 2003 IEEE, pp. 346-352.
Winter, T., et al.; *RPL: IPv6 Routing Protocol for Low-Power and Lossy Networks, Internet Engineering Task Force (IETF)*, Mar. 2012.
Vasseur, et al., *Routing Metrics used for Path Calculation in Low Power and Lossy Networks draft-ietf-roll-routing-metrics-12*, Networking Working Group, Nov. 8, 2010.
Thubert, P., *Objective Function Zero for the Routing Protocol for Low-Power and Lossy Networks (RPL)*, Internet Engineering Task Force (IETF), Mar. 2012.
Niimura, T, IEEE Member; Niu, Y, IEEE Student Member, *Transmission Congestion Relief by Economic Load Management*, 0-7803-7519-X/02/$17.00 © 2002, IEEE, pp. 1645-1649.

* cited by examiner

NETWORK TRAFFIC SHAPING FOR LOW POWER AND LOSSY NETWORKS

TECHNICAL FIELD

The present disclosure relates generally to computer networks, and, more particularly, to mechanisms for shaping network traffic flow.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound control traffic, support local (and slow) repair, etc. The RPL routing protocol provides a flexible method by which each node performs DODAG discovery, construction, and maintenance.

One problem that confronts LLNs is communication challenges. For instance, LLNs communicate over a physical medium that is strongly affected by environmental conditions that change over time. Some examples include temporal changes in interference (e.g. other wireless networks or electrical appliances), physical obstruction (e.g. doors opening/closing or seasonal changes in foliage density of trees), and propagation characteristics of the physical media (e.g. temperature or humidity changes). The time scales of such temporal changes can range between milliseconds (e.g. transmissions from other transceivers) to months (e.g. seasonal changes of outdoor environment). Additionally, low-cost and low-power designs limit the capabilities of LLN transceivers. In particular, LLN transceivers typically provide low throughput. Furthermore, LLN transceivers typically support limited link margin, making the effects of interference and environmental changes visible to link and network protocols.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
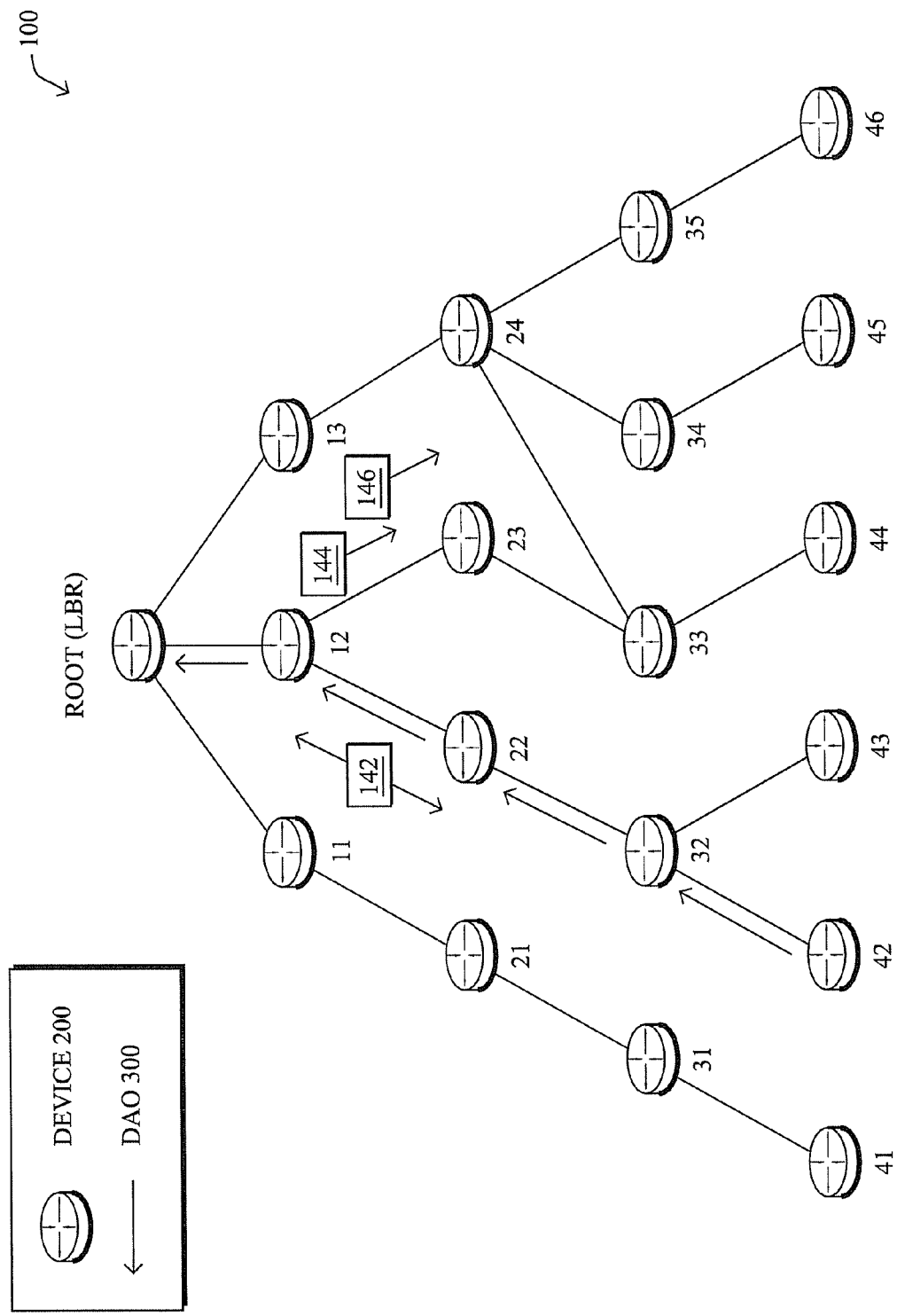
FIG. 1 illustrates an example computer network and a directed acyclic graph (DAG)

According to one or more embodiments, data packet messages are received in a Field Area Router (FAR) sent from one or more sources toward one or more destination devices in a Low-Power Lossy Network (LLN). An LLN routing topology for the data packet messages is interpolated in the FAR. An expected time for the data packet messages to reach a destination device in the LLN is determined based upon the routing topology interpolation. Traffic shaping is applied by the FAR for the data packet messages based upon the determined expected time for the data packet messages to reach destination devices in the LLN.

In another embodiment, data packet messages are received in a FAR device from a LLN. An LLN routing topology for the data packet messages is interpolated in the FAR. An approximate number of data packet messages the FAR is to receive from the LLN is determined. Traffic shaping is applied by the FAR for the data packet messages transmitting in the LLN to be received by the FAR based upon the determined number of data packet messages the FAR is to receive from the LLN.

In yet another embodiment, multicast data packet messages to be forwarded to a LLN are received in a FAR. An LLN routing topology for the multicast data packet messages is interpolated in the FAR. Traffic shaping is applied by the FAR for the multicast data packet messages by modeling the time it takes for a data packet message to propagate across a prescribed amount of nodal hops in the LLN prior to the FAR initiating subsequent transmission of multicast data packet messages in the LLN.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a type of wireless ad-hoc network, which is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

With reference now FIG. 1, shown is a schematic block diagram of an example computer network 100 illustratively comprising nodes/devices 200, such as, e.g., routers, sensors, computers, etc., interconnected by various methods of communication (e.g., and labeled as shown, "LBR," "11," "12," . . . "46"). For instance, the links of the computer network may be wired links or may comprise a wireless communication medium, where certain nodes 200 of the network may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices) while one or more of the devices may also be considered "destination nodes/devices."

Data packet messages 142 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
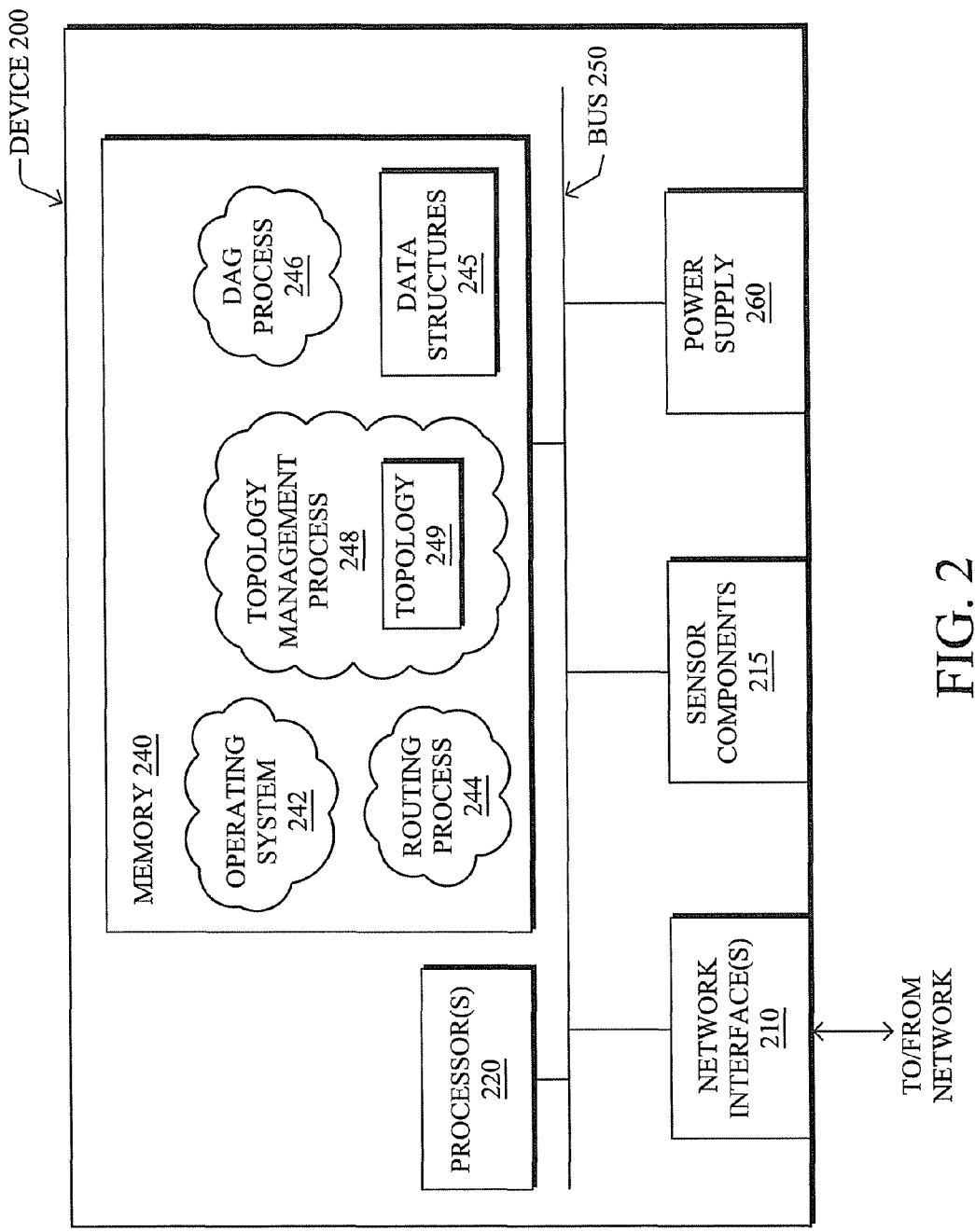
FIG. 2 illustrates an example network device/node.

FIG. 2 is a schematic block diagram of an example node/device 200 and a FAR device that may be used with one or more embodiments described herein, e.g., as a root node or sensor. The device may comprise one or more network interfaces 210, one or more sensor components 215 (e.g., sensors, actuators, etc.), a power supply 260 (e.g., battery, plug-in, etc.), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth (Registered trademark), etc.,), Ethernet, powerline communication (PLC) protocols, etc.

The memory 240 comprises a plurality of storage locations that are addressable by the processor(s) 220 and the network interface(s) 210 for storing software programs and data structures associated with the embodiments described herein. As noted above, certain devices may have limited memory or no memory (e.g., no memory for storage other than for programs/processes operating on the device). The processor(s) 220 may comprise necessary elements or logic adapted to execute the software programs and manipulate the data structures, such as routes or prefixes of a routing/forwarding table 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that the various processes may be embodied as modules configured to operate in accordance with the techniques herein (e.g., according to the functionality of a similar process).

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can direct the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) A number of use cases require specifying a set of link and node metrics, some of them being dynamic, thus requiring specific smoothing functions to avoid routing instability, considerably draining bandwidth and energy;

4) Constraint-routing may be required by some applications, e.g., to establish routing paths that avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained; LLN routers typically operate with constraints, e.g., processing power, memory, and/or energy (battery), and their interconnects are characterized by, illustratively, high loss rates, low data rates, and/or instability. The LLN may be sized with devices ranging from a few dozen to as many as thousands or even millions of LLN routers, and may support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph that represents a computer network, such as computer network 100, and that has the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or, as used herein, one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks" <draft-ietf-roll-routing-metrics> by Vasseur, et al. (Nov. 10, 2010 version). Further, an example OF (e.g., a default OF) may be found in an IETF RFC, entitled "RPL Objective Function 0" <RFC 6552> by Thubert (March 2012 version).

Building of a DAG may utilize a discovery mechanism to build a logical representation of the network, and route dissemination to establish state within the network so that routers know how to forward packets toward their ultimate destinations. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward (UP) direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root which can, in turn, build the topology and locally compute downward routes to all nodes in the DODAG. Such nodes are then reachable using source routing techniques over regions of the DAG that are incapable of storing downward routing state.

Figure 3:
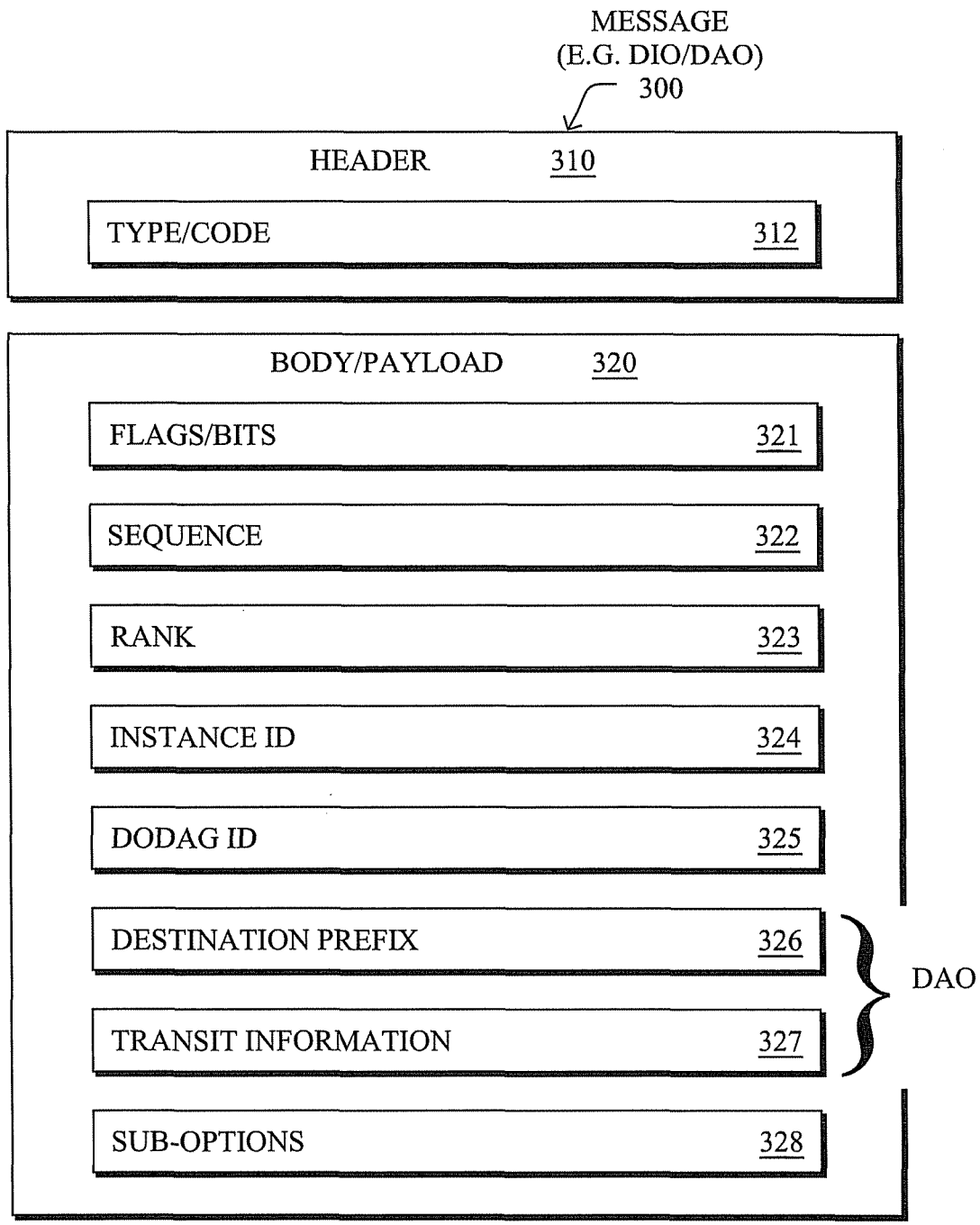
FIG. 3 illustrates an example message.

FIG. 3 illustrates an example DAO message 300 with a simplified control message format that may be used for discovery and route dissemination when building a DAG, e.g., as a DIO or DAO. Message 300 illustratively comprises a header 310 having one or more fields 312 that identify the type of message (e.g., a RPL control message) and a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, an instance ID 324, a (DO)DAG ID 325, and other fields, each as may be appreciated in more detail by those skilled in the art. Further, for DAO messages, fields for a destination prefix 326 and a reverse route stack 327 may also be included. For either DIOs or DAOs, one or more additional sub-option fields 328 may be used to supply additional or custom information (such as, e.g., the VGF) within the message 300. For instance, an objective code point (OCP) sub-option field may be used within a DIO to carry codes specifying a particular objective function (OF) to be used for building the associated DAG.

Illustratively, the techniques described herein may be performed by hardware, software, and/or firmware, such as in accordance with the topology management process 248, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the one or more routing protocols (e.g., RPL) or other communication protocols, and as such, may be processed by similar components understood in the art that execute those protocols, accordingly.

With the above generalized description provided above for LLNs and like networks, LLNs have several known problems (as mentioned above). For instance, and similar to other networks, LLNs can suffer from congestion collapse when they attempt to service too much data traffic. In many cases, the effects of congestion collapse can be more acute for a number of reasons. First, LLNs communicate using link technologies that provide relatively little link capacity yet forward traffic for hundreds or thousands of nodal devices. Second, the existence of LLN links are not known by virtue of a physical connection. Instead, LLN devices discover links to neighboring nodes and maintain an estimate of link quality using a variety of metrics (e.g. RSSI, LQI, and ETX). Congestion can cause link metrics to convey an inaccurate view of the link quality. Low-pass filters applied to such link metrics can reduce the reactiveness when congestion occurs, but also slows the recovery when congestion subsides.

It is to be understood in many LLN applications, LLN devices typically communicate with other devices outside the LLN. As a result, traffic typically flows through a Field Area Router (FAR) that connects the LLN to other IP-based networks. On one hand, since all LLN devices and the FAR have the same communication capabilities within the LLN, congestion typically occurs at or near the FAR. On the other hand, the FAR also serves as a choke-point for the vast majority of LLN traffic flows and can take advantage of that role to help avoid congestion collapse. An example of such a FAR is Cisco's 1000 Series Connected Grid Routers (CGR 1000 Series) which are multiservice communication platforms configured for use in Field Area Networks (FANs). Such FARs provide consistent communications platforms for distribution and remote workforce automation, and smart metering.

A FAR can maintain significantly more information about the network than most other LLN devices for a number of reasons. First, the FAR typically has more computer processing and memory resources than the LLN devices connected to it. Second, because traffic typically flows through the FAR, the FAR has more visibility into the nature of the traffic in the network. Third, routing protocols such as the Routing Protocol for LLNs (RPL) typically utilize the additional resources at the FAR to maintain routing information. For example, with non-storing mode in RPL, the FAR maintains the entire Directed Acyclic Graph (DAG) topology.

It is also to be understood traffic shaping is a technique that delays some or all datagrams to match a desired traffic profile. Traffic shaping is a form of rate limiting and is especially important in networks that have limited resources (e.g., LLNs). A Traffic shaper is parameterized by a desired traffic profile and is often implemented using leaky bucket or token bucket algorithms. A number of input/output traffic shaping techniques have been developed in the past for many types of link layers (e.g., ATM, FR, IP, etc.).

Thus, in view of the above, it will be understood from the below description with reference to certain embodiments, aggregate throughput and efficiency of the LLN is significantly increased by dynamically adjusting the traffic shaping profile for data traffic admitted into a LLN. As noted above, an advantage of traffic shaping is avoidance of known issues caused by short or long-term congestion in LLNs. As will be appreciated from the below description, with knowledge of the routing topology, a FAR can adjust the rate at which data packets are admitted into the network based on the particular path that a packet must traverse through the network. In differentiation from existing known traffic shaping techniques, the below described FAR actively adjusts the traffic profile based on the routing topology. That is, the below described FAR is preferably configured and operative to dynamically adjust data packet traffic profiles used within a LLN based on the actual traffic and routing topology of the LLN.

It is to be appreciated shared communication media in LLNs (e.g., mesh networks) differs from more traditional networks such (e.g. Ethernet and WiFi). In Ethernet networks, the physical media acts as a single broadcast domain where only a single device may transmit at a time and multiple hops are segmented by distinct physical media that do not interfere with each other. For instance, when forwarding a message in an Ethernet network having a plurality of nodal devices, successive nodal devices can transmit their respective messages to respective next hops simultaneously. With regards to a WiFi network, the physical media is more complex, and in contrast to Ethernet, the physical media is not a single broadcast domain. Instead, typical WiFi deployments form a star topology, where multiple clients communicate directly with a single access point. While the access point typically has a good view of the physical media's activity, the client devices may not due to the well-known hidden-terminal problem.

With returning reference to FIG. 1, multihop mesh networks (e.g., LLNs) take the physical media complexity a step further. In particular, the rate at which a device can deliver messages depends on how many hops the message must traverse. When the destination is only 1 hop away, the source can transmit packets back-to-back since the destination will immediately consume the message. However, when the destination is 2 hops away, the source must transmit packets at half the rate. For instance, when forwarding packets 144 and 146 from device LBR along the path LBR->12->23, the first packet (144) goes from LBR->12 and then from 12->23. Note, however, that when the first packet (144) goes from 12->23, the second packet (146) which is to go from LBR->12 cannot transmit at the same time since their respective messages (144, 146) would collide. And when extending this example to three hops, the packet going from 12->23 cannot transmit at the same time as the other packet going from LBR->12 since they would collide at 12.

It is thus to be appreciated that when using a routing protocol such as RPL, the FAR has complete knowledge of the routing topology. In the case of RPL with non-storing mode (the mode implemented in CG-Mesh), the FAR knows the complete DAG topology. With this information, and as described below, a FAR is able to dynamically adjust the parameters of a traffic shaper based on a packet's destination and the routing topology. Hence the correlation between traffic shaping and routing topology. Since in the below described embodiments the vast majority of traffic flows through a FAR, the FAR is advantageously positioned for applying traffic shapers. Furthermore, a FAR is generally the source of congestion and primarily utilizes knowledge of the routing topology within the first few hops to alleviate such congestion.

Figure 4:
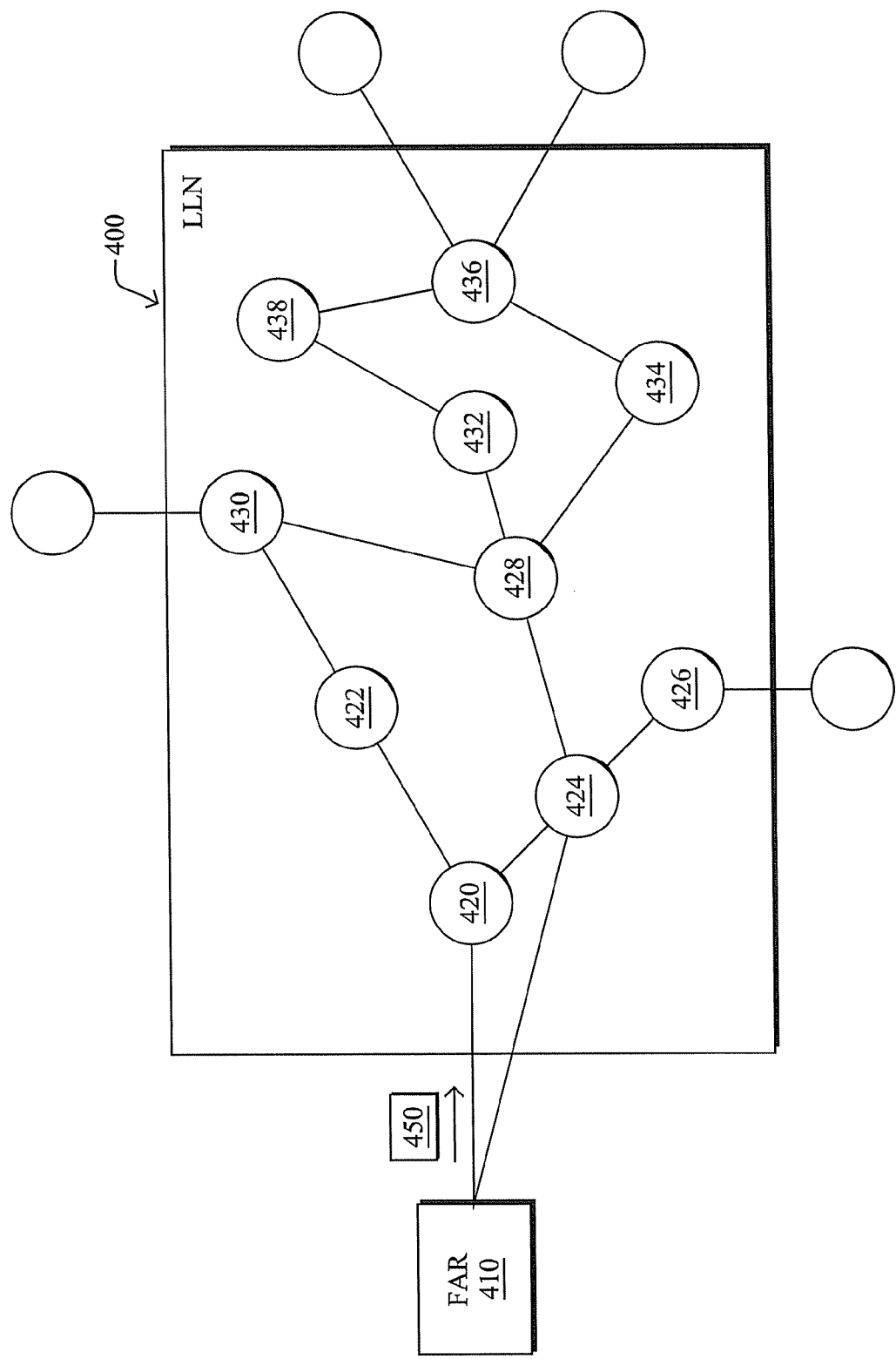
FIGS. 4 and 5 illustrates example networks coupled to a Field Area Router.
Figure 6:
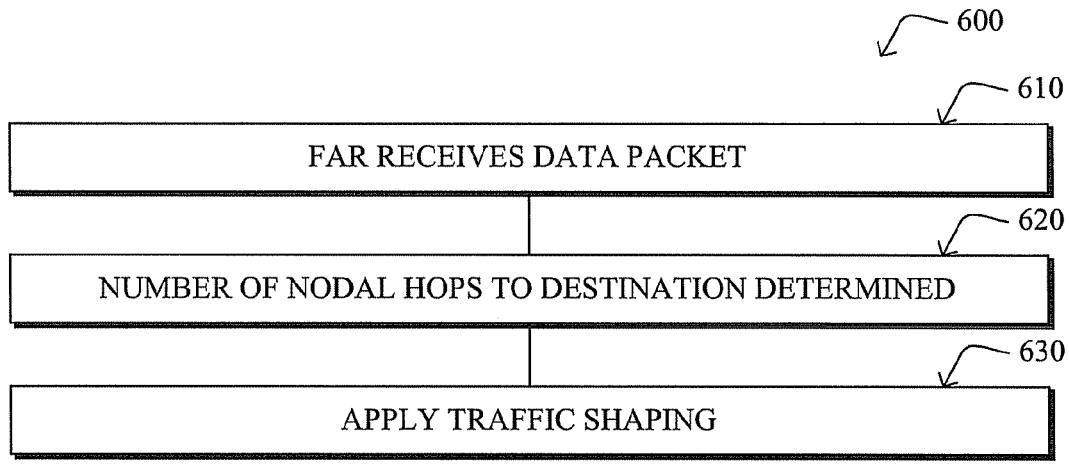
FIGS. 6 and 7 illustrate example simplified procedures for routing data packet messages with traffic shaping techniques according to certain illustrated embodiments.

With reference now to the illustrated embodiment of FIG. 4 and the process 600 of FIG. 6, shown and described is a FAR device 410 coupled to a LLN 400 having nodal devices 420 to 448. In this embodiment, the FAR 410 is operational to perform downward forwarding of preferably unicast data packet messages 450 that travel from the FAR 410 to a device located in the LLN 400 using routing topology for the packet messages 450 (step 610). For instance, in one embodiment, for each packet (e.g., 450) that the FAR 410 services, the FAR 410 is configured and operational to determine if the destination is 1 hop, 2 hop, or 3+ hops away in the LLN 400 (step 620). If it is determined it is 1 hop away (e.g., 420), the FAR preferably does not delay (e.g., traffic shaping) any subsequent downward packets since the destination (420) will immediately consume the packet (450) and does not forward the packet (450) to any other node. If it is determined the destination is 2 hops away (e.g., 422), the FAR 410 delays a subsequent data packet message following transmission by the "expected time" (as discussed below) it takes for the packet to reach the two hop destination. If it is determined the destination is 3 or more hops away (e.g., 432) the FAR 410 delays a subsequent data packet transmission by the expected time it takes for the packet to reach such a multi-hop destination (432), which may or may not be the final destination for the data packet (step 630). It is noted this is particularly advantageous to single-channel networks where all devices communicate on a common channel. This is likewise advantageous in channel-hopping networks since there is some probability that two nodes may utilize the same channel.

In one embodiment, the "expected time" is a function of the Carrier Sense Multiple Access (CSMA) backoff, packet length, and bit rate. In another embodiment, the "expected time" may take into account the link quality between nodal devices for the packet message path. For example, the estimated transmission count (ETX) provides an estimate on the number of transmissions it takes to communicate a message to its destination. Thus, the FAR (410) may scale the time delay by the ETX value. It is to be appreciated the above description classifies all packets with a destination of 3 or more hops into the same bin. In another embodiment, the FAR (410) may add additional time delays based on the number of hops and/or qualities of the links to reach the destination. Longer paths are more likely to incur external interference and typically have larger variance in communication delays. A high ETX (i.e. poor) link more than three hops away can also cause packets to backup at nodes closer to the FAR, causing higher queue occupancies and channel contention. For these reasons, it is to be understood the FAR (410) may add additional delays based on the path length and link qualities on the path, both of which affect the variance in communication latency.

In accordance with another embodiment, the FAR (410) is operational and configured to adjust the traffic shaping delays based on how many intermediate nodal hops are shared among the paths to different destinations. For example, if two paths (e.g., 420-422-430 and 424-428-432) do not share any intermediate nodes (except for the FAR 410), the FAR 410 is configured to transmit packets back-to-back by alternating between the paths. However, if two paths share all the same intermediate nodes, the FAR 410 may preferably introduce traffic shaping delays based on all of the considerations above. Note that in a channel-hopping system, the FAR 410 may consider that different transmitters can transmit simultaneously as long as they are on different channels. For example, this knowledge affects whether or not the FAR (410) must wait for a message to propagate 2 hops or 3 hops before sending the next message.

Figure 5:
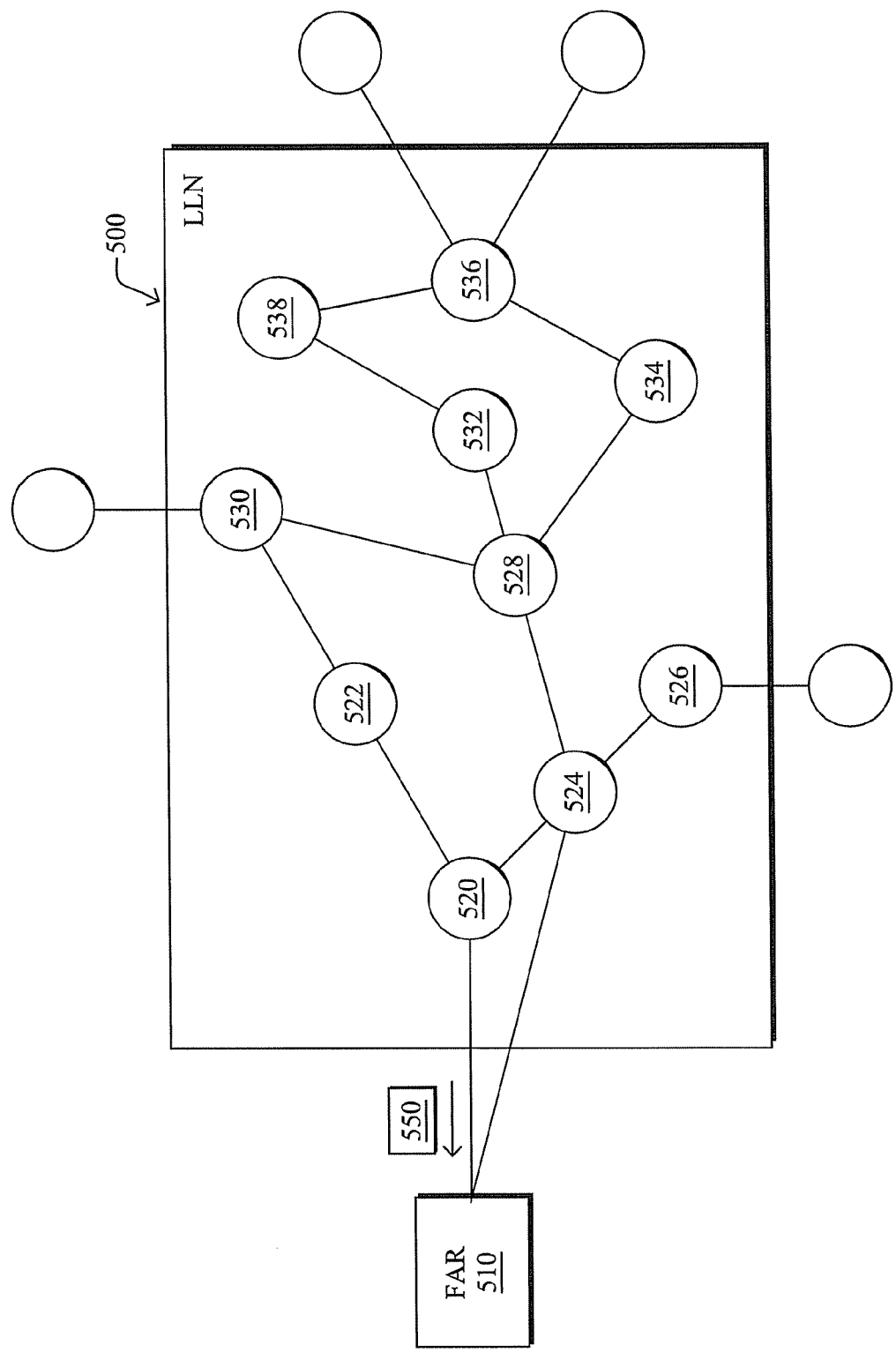
Figure 7:
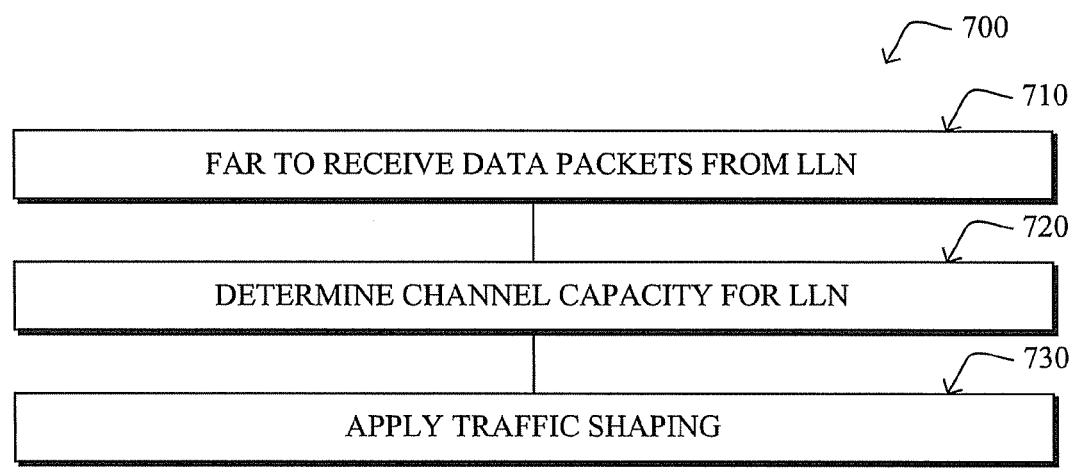

With reference now to the illustrated embodiment of FIG. 5 and process 700 of FIG. 7, shown and described is a FAR device 510 coupled to a LLN 500 having nodal devices 520 to 548. In this embodiment, the FAR 510 is operational to perform upward forwarding of preferably unicast data packet messages 550 that travel to the FAR 510 from devices located in the LLN 500 using routing topology for the packet messages 550 (step 710). For instance, in one embodiment, the FAR 510 is configured and operational to initially attempt to give each LLN device (520-538) an equal share of the network capacity to the FAR 510. It is to be understood a primary location of network congestion is typically located at the FAR 510 itself. Without knowledge of the routing topology, a naive approach would simply divide the FAR's (510) link capacity by the total number of nodes in the network 500. While this forms an initial baseline, this naive approach does not consider that acknowledgment frames sent from 1-hop nodes back to 2-hop nodes also collide with any traffic sent to the FAR 510. Thus, in accordance with the illustrated embodiment, the FAR 510 is operational and configured to scale (e.g., using traffic shaping techniques) the data packet traffic rate based on the number of transmissions (550) that the FAR 510 expects to experience from the LLN 500. In one such illustrative embodiment, the FAR 510 divides the total channel capacity based on the number of 1-hop devices and 2+ hop devices in the LLN (step 720). In particular, the FAR may divide by (A+2*B) where A is the number of 1-hop devices and B is the number of 2 or more hop devices.

It is to be appreciated, and in contrast to the above described illustrative embodiment of FIG. 5 concerning downward trafficking of data messages 550 from a FAR 510 to a LLN 500, the traffic shapers for upward trafficking of data messages 550 to a FAR 510 from a LLN 500 are implemented on each LLN device (520-538) and are preferably applied to data packet messages that each LLN device sources (step 730). It is to be understood the FAR 510 is operative and configured to communicate the necessary information to each LLN device in a number of methods. For instance, in one embodiment, the FAR 510 communicates the number of 1-hop and 2 or more hop devices to each LLN device (520-538). In another illustrative embodiment, the FAR 510 communicates the traffic profile to each LLN device (520-538). In yet another illustrative embodiment, the FAR 510 communicates the information utilizing a RPL option in DIO messages, an IEEE 802.15.4e Information Element in Enhanced Beacons, or a dedicated ICMPv6 Control message.

In still another illustrative embodiment, the FAR (510) is configured and operational to dynamically adjust the amount of message capacity allocated to each node (520-538) based on the number of nodes, routing topology, and the traffic activity in the LLN 500. For instance, a remote sub-DAG may have poor connectivity to the remaining portion of the network, and as a result, restricting all nodes to maintain the same traffic rate does not utilize the full capacity of the entire network. Thus, the FAR 510 is configured and operational to determine that a subset of nodes can only utilize a portion of the network's capacity near the root and thus allocates the available capacity to nodes that have better connectivity.

With an above description of certain illustrative embodiments provided in regards to FAR downward and upward forwarding of unicast messages, description will be provided in regards to FAR forwarding of multicast data packet messages. It is to understood multicast forwarding applies to multicast packet messages that are forwarded by the FAR to an LLN. It is also to be understood, in LLNs, multicast is typically implemented as a form of flood initiated by the FAR and may be implemented in different ways. For instance, Naive Flood involves having every node rebroadcast the message at least once. Trickle Flood involves using a combination of adaptive transmission timers with suppression so that the number of transmissions scales with the log of node density. And Reduced-Topology Flood involves forming a reduced topology (e.g. by discovering a Connected Dominating Set) and only having those nodes rebroadcast the message.

In one illustrative embodiment, the FAR (410) models the time it takes for a data packet message to propagate past the first few hops in a LLN (400) before the FAR (410) initiates a subsequent multicast data packet transmission. For example, with Naive Flood, the FAR (410) can compute the number of transmissions within the first 3 hops in the LLN (400) by determining the number of nodes within the first 3 hops. With regards to Trickle Flood, the FAR 410 is configured and operational to determine the number of transmissions by taking the log of the nodes within the first 3 hops in the LLN (400). And with regards to Reduced-Topology Flood, the FAR determines the number of nodes in the multicast forwarding topology that are within 3 hops of the FAR.

Hence, and in contrast to the above described the methods for forwarding unicast data packet messages, areas with high density away from the FAR (410) may also affect the multicast flood, thus performance of the aforesaid flooding techniques are preferably contingent on the density of nodal devices. For instance, in the scenario where the LLN (400) in proximity to the FAR (410) is sparse but is relatively dense in a patch of nodal devices that is several hops away from the FAR 410, the multicast propagation rate is preferably limited by the dense patch itself. It is to be understood, unicast messages are typically not affected by such densities since each unicast message only causes a few transmissions within a given cell.

In another illustrative embodiment for multicast messages, the FAR (410) is operational and configured to model the time it takes to propagate the multicast message throughout the entire LLN (400) based upon the FAR's (410) knowledge of the routing topology. For example, for both Naive and Trickle Floods, the FAR (410) may search for the patch of network that is most dense, and compute the number of transmissions are expected for each multicast message. The FAR (410) then scales the multicast forwarding rate accordingly.

In view of the above described description for certain illustrated embodiments, it is to be now appreciated a FAR device (410) according to these embodiments is operational and configured to effectively compute the available capacity based on the routing topology of an LLN and a message packet's destination to ensure that the traffic rate does not exceed capacity. In addition to the packet's destination, the FAR may classify traffic and utilize capacity according to the traffic class. It is to be appreciated and understood, any existing mechanism to classify traffic may be utilized (e.g. IPv6 Traffic Class, DPI, etc.). Thus, implementing the above described embodiments with traffic classification enables policies that allocate a capacity percentage to each traffic class. It is to be appreciated, existing mechanisms typically assume a fixed capacity (e.g. based on the link's physical data rate). For example, some policies are specified by absolute data rates (e.g. kbps). Other policies based on percentage are often implemented assuming a fixed data rate. However, when utilizing the above described embodiments, and since a network's actual capacity depends on the routing topology and packet destination, the FAR (410) is now configured and operational to inject packets by also dynamically computing how much capacity may be given to a particular traffic class. In one such embodiment, the FAR (400) computes the delay for maximum throughput and scales that by the percentage given in the policy configuration.

Accordingly, with certain illustrative embodiments described above, what has been described in one aspect is the utilization of routing topology information to actively adjust a traffic shaper policy for data packets in a LLN. That is, a traffic profile is actively determined based on the path a data packet travels and the LLN routing topology. In regards to unicast messages, the FAR considers the length of the path, and in some instances, the link qualities along the path and the traffic activity. With regards to multicast messages, the FAR determines the expected time to propagate the message through the most dense portion(s) of the LLN.

Thus, an advantage provided is optimization of the aggregate throughput and efficiency of an LLN by ensuring that channel utilization in the LLN operates efficiently. By intelligently adjusting traffic shaping behavior, a FAR device actively mitigates the occurrence of congestion and its negative side effects (e.g., skewed link quality estimates, routing instability, etc.). Hence, by utilizing information with the data packet and the routing topology known to a FAR, no additional control messages are required to monitor the state of the network.

It is to be appreciated that while certain steps within procedures 600 and 700 may be optional as described above, the steps shown in FIGS. 6 and 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for traffic shaping by a FAR device, it is to be understood that various other adaptations and modifications may be made within the spirit and scope of the embodiments herein. For example, the embodiments have been shown and described herein with relation to LLN networks, and, in particular, the RPL protocol. However, the embodiments in their broader sense are not as limited, and may, in fact, be used with other types of networks and/or protocols.

The foregoing description has been directed to specific illustrated embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a Field Area Router (FAR) device, data packet messages from a Low-Power Lossy Network (LLN);
   interpolating, in the FAR, LLN routing topology for data packet messages to be received from the LLN;
   determining an approximate number of data packet messages the FAR is to receive from the LLN by dividing a channel capacity of the FAR by an amount of 1-hop and 2-hop nodal devices in the LLN which transmit data packet messages to the FAR; and
   applying traffic shaping by the FAR for the data packet messages transmitting in the LLN to be received by the FAR based upon the determined number of data packet messages the FAR is to receive from the LLN.

2. The method as recited in claim 1, wherein the applying traffic shaping step includes delaying transmission of data packet messages in the LLN to be received by the FAR.

3. The method as recited in claim 1, wherein the dividing step uses the formula $(A+2(B))/N$ whereby A equals the amount 1-hop nodal devices, B equals the amount of 2-hop nodal devices, and N equals the channel capacity of the FAR.

4. The method as recited in claim 1, wherein the applying traffic shaping step includes implementing traffic shaping on each nodal device in the LLN so as to be applied to each data packet message received by each nodal device wherein the FAR communicates traffic shaping information to each nodal device.

5. The method as recited in claim 4, wherein the applying traffic shaping step further includes the FAR communicating a number of 1-hop and 2-hop nodal devices in the LLN to each nodal device in the LLN.

6. The method as recited in claim 4, wherein the applying traffic shaping step further includes the FAR communicating a data message packet traffic profile to each nodal device in the LLN.

7. The method as recited in claim 1, wherein the applying traffic shaping step further includes the FAR adjusting a capacity allocation for each nodal device in the LLN.

8. The method as recited in claim 7, wherein the step of adjusting a capacity allocation for each nodal device in the LLN is based upon the number of nodal devices in the LLN, the routing topology and traffic activity for the LLN.

9. An apparatus, comprising:
   one or more network interfaces configured to communicate with a Low Power and Lossy Network (LLN);
   a processor coupled to the interfaces and adapted to execute one or more processes; and
   a memory configured to store a Field Area Router (FAR) process executable by the processor, the process when executed operable to:
   receive data packet messages from LLN devices;
   interpolate a routing topology for data packet messages to be received from the LLN;
   determine an approximate number of data packet messages to be received from the LLN by dividing a channel capacity of the FAR by an amount of the 1-hop nodal devices and 2-hop nodal devices in the LLN which data packet messages travel across subsequent to reaching the FAR; and
   apply traffic shaping for the data packet messages transmitting in the LLN based upon the determined number of data packet messages to be received from the LLN.

10. The apparatus as recited in claim 9, wherein the dividing step uses the formula $(A+2(B))/N$ whereby A equals the amount 1-hop nodal devices, B equals the amount of 2-hop nodal devices, and N equals the channel capacity of the FAR.

11. The apparatus as recited in claim 9, wherein the traffic shaping is applied by implementing traffic shaping on each nodal device in the LLN so as to be applied to each data packet message received by each nodal device wherein the FAR communicates traffic shaping information to each nodal device.

12. The apparatus as recited in claim 11, wherein the traffic shaping includes the FAR communicating a number of 1-hop and 2-hop nodal devices in the LLN to each nodal device in the LLN.

13. The apparatus as recited in claim 11, wherein the traffic shaping includes the FAR communicating a data message packet traffic profile to each nodal device in the LLN.

14. The apparatus as recited in claim 9, wherein the traffic shaping includes the FAR adjusting a capacity allocation for each nodal device in the LLN.

15. The apparatus as recited in claim 14, wherein adjusting a capacity allocation for each nodal device in the LLN is based upon the number of nodal devices in the LLN, the routing topology and traffic activity for the LLN.

16. A tangible, non-transitory, computer-readable media having software encoded thereon, the software when executed by a processor operable to:
   receive data packet messages from Low Power and Lossy Network (LLN)devices at a Field Area Router (FAR);
   interpolate a routing topology for data packet messages to be received from the LLN;
   determine an approximate number of data packet messages to be received from the LLN by dividing a channel capacity of the FAR by an amount of the 1-hop nodal devices and 2-hop nodal devices in the LLN which data packet messages travel across subsequent to reaching the FAR; and
   apply traffic shaping for the data packet messages transmitting in the LLN based upon the determined number of data packet messages to be received from the LLN.

17. The tangible, non-transitory, computer-readable media as recited in claim 16, wherein the dividing step uses the formula $(A+2(B))/N$ whereby A equals the amount 1-hop nodal devices, B equals the amount of 2-hop nodal devices, and N equals the channel capacity of the FAR.

18. The tangible, non-transitory, computer-readable media as recited in claim 16, wherein the traffic shaping is applied by implementing traffic shaping on each nodal device in the LLN so as to be applied to each data packet message received by each nodal device wherein the FAR communicates traffic shaping information to each nodal device.

19. The tangible, non-transitory, computer-readable media as recited in claim 18, wherein the traffic shaping includes the FAR communicating a number of 1-hop and 2-hop nodal devices in the LLN to each nodal device in the LLN.

* * * * *